United States Patent
Bai

(10) Patent No.: US 11,052,911 B2
(45) Date of Patent: Jul. 6, 2021

(54) SPEED CONTROL DEVICE

(71) Applicant: ISUZU MOTORS LIMITED, Tokyo (JP)

(72) Inventor: Dongsheng Bai, Yamato (JP)

(73) Assignee: ISUZU MOTORS LIMITED, Tokyo (JP)

( * ) Notice: Subject to any disclaimer, the term of this patent is extended or adjusted under 35 U.S.C. 154(b) by 132 days.

(21) Appl. No.: 16/302,113

(22) PCT Filed: May 1, 2017

(86) PCT No.: PCT/JP2017/017112
§ 371 (c)(1),
(2) Date: Nov. 16, 2018

(87) PCT Pub. No.: WO2017/199742
PCT Pub. Date: Nov. 23, 2017

(65) Prior Publication Data
US 2019/0283750 A1    Sep. 19, 2019

(30) Foreign Application Priority Data

May 16, 2016    (JP) .............................. JP2016-098023

(51) Int. Cl.
*B60W 30/14*    (2006.01)
*G05D 1/02*    (2020.01)
(Continued)

(52) U.S. Cl.
CPC .......... *B60W 30/146* (2013.01); *B60W 10/04* (2013.01); *B60W 30/143* (2013.01);
(Continued)

(58) Field of Classification Search
CPC .......................... B60W 30/146; B60W 30/143
See application file for complete search history.

(56) References Cited

U.S. PATENT DOCUMENTS 5,646,850 A * 7/1997 Ishida .................. B60K 31/047
                                                           123/352
8,271,176 B2 * 9/2012 Kondou ................. G01C 21/26
                                                            701/72
(Continued)

FOREIGN PATENT DOCUMENTS

JP    03-142507 A    6/1991
JP    05-058193 A    3/1993
(Continued)

OTHER PUBLICATIONS

International Search Report from International Application No. PCT/JP2017/017112 dated Jun. 27, 2017.
(Continued)

*Primary Examiner* — Anne Marie Antonucci
*Assistant Examiner* — Abdalla A Khaled
(74) *Attorney, Agent, or Firm* — Brundidge & Stanger, P.C.

(57) ABSTRACT

The speed control device is equipped with: an actual speed acquisition unit; an actual position acquisition unit; an acceleration/deceleration control unit; and a travel resistance calculation unit. When in a situation in which an target speed increases from a first target speed to a second target speed, the target speed in the second road section is set such that an actual speed increases with a first-order lag from the first target speed to the second target speed over a period between the start position and end position of the second road section, and the target speed in the second road section is set such that the amount of change in the speed, which increases with the first-order lag, with respect to the travel time of the vehicle is decreased as the travel resistance calculated by the travel resistance calculation unit increases.

4 Claims, 7 Drawing Sheets

(51) Int. Cl.
  *B60W 50/00* (2006.01)
  *B60W 10/04* (2006.01)
  *G01C 21/26* (2006.01)
  *F02D 29/02* (2006.01)

(52) U.S. Cl.
  CPC ......... *B60W 50/0097* (2013.01); *F02D 29/02* (2013.01); *G01C 21/26* (2013.01); *G05D 1/0223* (2013.01); *B60K 2310/244* (2013.01); *B60W 2050/0042* (2013.01); *B60W 2520/10* (2013.01); *B60W 2530/16* (2013.01); *B60W 2552/20* (2020.02); *B60W 2552/40* (2020.02); *B60W 2555/60* (2020.02); *B60W 2556/50* (2020.02); *B60W 2720/106* (2013.01); *G05D 2201/0213* (2013.01)

(56) References Cited

U.S. PATENT DOCUMENTS

| | | |
|---|---|---|
| 8,504,274 B2 | 8/2013 | Park |
| 8,954,256 B2 | 2/2015 | Isaji et al. |
| 2003/0074124 A1 | 4/2003 | Ono et al. |
| 2009/0048755 A1 | 2/2009 | Tokimasa et al. |
| 2009/0265072 A1 | 10/2009 | Kondou et al. |
| 2010/0250084 A1 | 9/2010 | Takiguchi et al. |
| 2011/0282559 A1 | 11/2011 | Isaji et al. |
| 2015/0232092 A1* | 8/2015 | Fairgrieve ............... B60L 3/106 701/93 |
| 2018/0111615 A1* | 4/2018 | Yamakado .......... B60W 40/068 |

FOREIGN PATENT DOCUMENTS

| | | |
|---|---|---|
| JP | 2003-039974 A | 2/2003 |
| JP | 2003-094983 A | 4/2003 |
| JP | 2006-200526 A | 8/2006 |
| JP | 2009-018681 A | 1/2009 |
| JP | 2009-264124 A | 11/2009 |
| JP | 2010-235088 A | 10/2010 |
| JP | 2011-255876 A | 12/2011 |

OTHER PUBLICATIONS

Extended European Search Report from EP Application No. 17799172.6 dated Apr. 23, 2019.

* cited by examiner

SPEED CONTROL DEVICE

TECHNICAL FIELD

The present disclosure relates to a speed control device.

BACKGROUND ART

In recent years, researches on automated driving systems have been increasingly developed as solutions for automobile traffic problems in relation with intelligentization and computerization of automobile traffic. An automated driving system is, for example, a system for performing autonomous driving control of a vehicle such as start/stop in which a target driving route including a plurality of road sections, and a target speed (also referred to as "restriction speed") set in advance for each road section are provided in advance. In a vehicle, a speed control device is mounted. The speed control device controls the accelerator amount and the brake amount of the vehicle such that the actual speed of the vehicle is set to the target speed set for a road section including the actual position of the vehicle.

PTL 1 discloses, as a technique for automatic driving, a technique for staring automatic driving of a vehicle along the guiding line on the travelling road surface based on allowance of an automatic driving allowing switch.

CITATION LIST

Patent Literature

PTL 1
Japanese Patent Application Laid-Open No. H3-142507

SUMMARY OF INVENTION

Technical Problem

Incidentally, when the target speed increases (i.e. the vehicle accelerates) stepwise in the above-mentioned automated driving system, the actual speed of the vehicle abruptly increases, and overshooting, in which the actual speed exceeds the target speed, might occur. In addition, for example, when the travelling resistance of the vehicle is increased such as when a vehicle goes up a steep slope the like, the ease of acceleration of the vehicle is reduced, and the time taken for sufficient acceleration is increased. As a result, excessive acceleration is performed after the actual speed of the vehicle becomes close to the target speed, and the actual speed abruptly increases, and in turn, the overshooting easily occurs.

An object of the present disclosure is to provide a speed control device which can suppress occurrence of overshooting in acceleration of a vehicle.

Solution to Problem

A speed control device according to the present disclosure is configured to control a speed of a vehicle travelling along a driving route including a plurality of road sections including first and second road sections, in which a target speed is set for each of the plurality of road sections, the speed control device including: an actual speed acquiring section configured to acquire an actual speed of the vehicle; an actual position acquiring section configured to acquire an actual position of the vehicle; an acceleration/deceleration control section configured to control an acceleration/deceleration of the vehicle such that the actual speed is set to a target speed set for one of the plurality of road section corresponding to the actual position; and a travelling resistance calculation section configured to calculate a travelling resistance of the vehicle in a travelling state. A target speed for the second road section is set such that, in a case where the target speed is increased from a first target speed to a second target speed as the actual position moves from the first road section to the second road section, the actual speed is set to be increased from the first target speed to the second target speed by a primary delay between a start position to an end position of the second road section. The target speed for the second road section is set such that a variation of the target speed that increases by the primary delay with respect to a travelling time of the vehicle is reduced as the travelling resistance calculated by the travelling resistance calculation section increases.

Advantageous Effects of Invention

According to the present disclosure, the target speed is set such that the target speed does not change stepwise and that the inclination of a variation of the target speed gradually decreases, it is possible to suppress occurrence of overshooting in which the actual speed exceeds the target speed (second target speed) when the vehicle is accelerated from the first target speed to the second target speed. In addition, since the variation of the speed that increases by the primary delay is reduced in accordance with the travelling resistance of the travelling vehicle, the time enough for acceleration of the vehicle can be ensured and occurrence of overshooting can be further suppressed.

DESCRIPTION OF EMBODIMENTS

Figure 1:
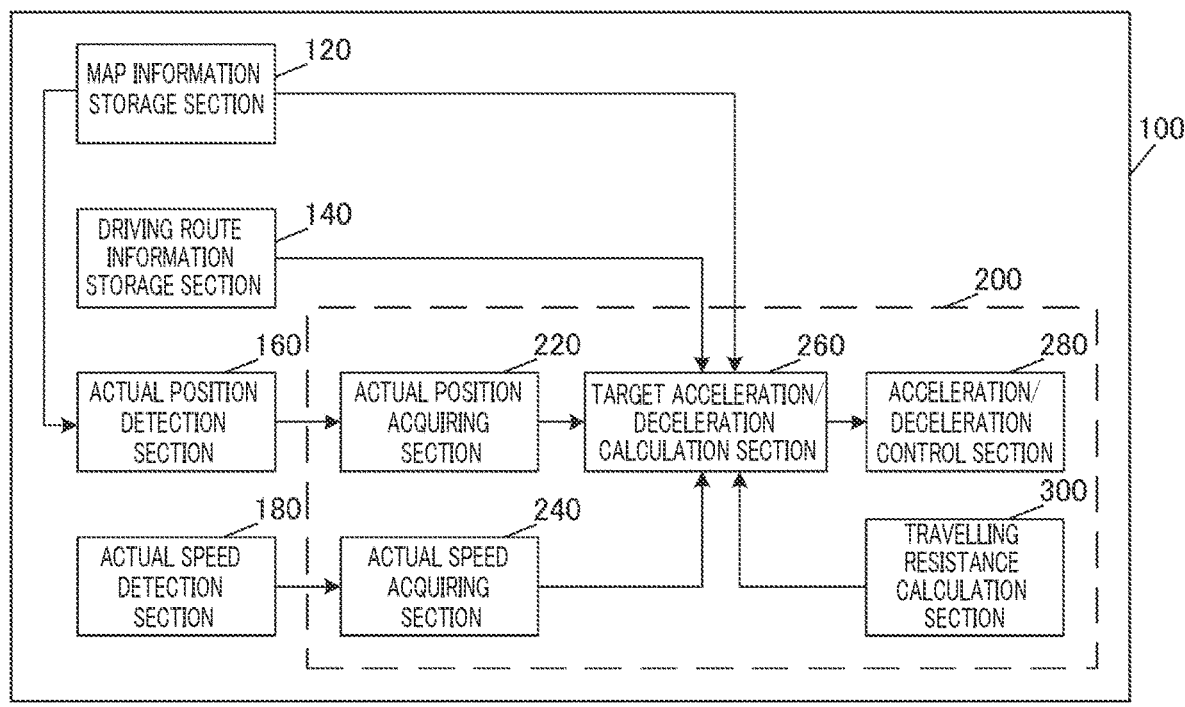
FIG. 1 is a functional block diagram illustrating a configuration of a vehicle of an embodiment.

An embodiment of the present disclosure is described below with reference to the accompanying drawings. FIG. 1 is a functional block diagram illustrating a configuration of vehicle 100 of the present embodiment. In the present embodiment, vehicle 100 is a large vehicle, such as a truck in which a diesel engine (internal combustion engine) is mounted, which is intended for an automated driving system. Specifically, vehicle 100 has a configuration for performing an autonomous driving control, including start/stop, of vehicle 100. In this configuration, a driving route (e.g. a highway) including a plurality of road sections along which vehicle 100 travels, and a target speed set in advance for each road section are provided in advance.

As illustrated in FIG. 1, vehicle 100 includes map information storage section 120, driving route information storage section 140, actual position detection section 160, actual speed detection section 180 and speed control device 200.

Map information is stored in map information storage section 120. The map information includes road information representing a road on a map and configured to be used for map display, route search and the like, and facility information representing facilities along the road. The road information is composed of road section information (e.g. the road width, road length, grade, coefficient of friction between tire and road surface and the like) relating to links obtained by dividing a road and/or a lane into a small pieces (hereinafter referred to as "road section"), and node information relating to a node corresponding to both end points of each road section (including points where a plurality of roads intersect such as an intersection and a branch). It is to be noted that, in the case where a road section includes a curve, the road section information includes information relating to the radius, curvature and the like of the curve.

Driving route information storage section 140 stores driving route information relating to a driving route including a plurality of road sections. The driving route information includes target speeds set for a plurality of road sections of a driving route. The target speed is a predetermined speed to which the actual speed of vehicle 100 (hereinafter referred to as "actual speed") is to be set when vehicle 100 travels the road section.

Actual position detection section 160 detects the actual position (present position) of vehicle 100 on the map on the basis of information representing longitude and/or the latitude of vehicle 100 acquired by an autonomous navigation sensor (not illustrated) and/or a GPS receiver (not illustrated), and the map information stored in map information storage section 120. Then, actual position detection section 160 outputs the detected actual position to speed control device 200.

Actual speed detection section 180 is a vehicle speed sensor for example, and detects the actual speed (travelling speed) of vehicle 100. Then, actual speed detection section 180 outputs the detected actual speed to speed control device 200.

Speed control device 200 controls the speed of vehicle 100 travelling along a driving route indicated by the driving route information stored in driving route information storage section 140. As illustrated in FIG. 1, speed control device 200 includes actual position acquiring section 220, actual speed acquiring section 240, target acceleration/deceleration calculation section 260, acceleration/deceleration control section 280 and travelling resistance calculation section 300. It is to be noted that, target acceleration/deceleration calculation section 260 and acceleration/deceleration control section 280 correspond to "acceleration/deceleration control section" of the present disclosure.

Actual position acquiring section 220 acquires an actual position output from actual position detection section 160 and outputs the acquired actual position to target acceleration/deceleration calculation section 260.

Actual speed acquiring section 240 acquires the actual speed output from actual speed detection section 180 and outputs the acquired actual speed to target acceleration/deceleration calculation section 260.

On the basis of the map information stored in map information storage section 120 and the driving route information stored in driving route information storage section 140, target acceleration/deceleration calculation section 260 calculates a target acceleration/deceleration for setting the actual speed output from actual speed acquiring section 240 to the target speed set in the road section including the actual position output from actual position acquiring section 220.

To be more specific, target acceleration/deceleration calculation section 260 calculates a target acceleration/deceleration by a method of a PI (Proportional-Integral) feedback-control on the speed deviation between the target speed and the actual speed.

When the target acceleration/deceleration calculated by target acceleration/deceleration calculation section 260 has a positive value (i.e. when vehicle 100 is required to be accelerated), acceleration/deceleration control section 280 determines the accelerator opening (the operation amount of the accelerator of vehicle 100) by referring to the accelerator map in accordance with the target acceleration/deceleration calculated by target acceleration/deceleration calculation section 260, and, controls a vehicle electronic control machine (ECM) for performing engine control in accordance with the determined accelerator opening. It is to be noted that, when the target acceleration/deceleration calculated by target acceleration/deceleration calculation section 260 has a positive value, acceleration/deceleration control section 280 may control factors (e.g. the fuel injection amount) other than the operation amount of the accelerator of vehicle 100.

In addition, when the target acceleration/deceleration calculated by target acceleration/deceleration calculation section 260 has a negative value (i.e. when vehicle 100 is required to be decelerated), acceleration/deceleration control section 280 determines the braking force (the amount of the braking operation of vehicle 100) by referring to the braking force gain in accordance with the target acceleration/deceleration calculated by target acceleration/deceleration calculation section 260, and controls an EBS (electric braking system) for generating the braking force in accordance with the determined braking force. It is to be noted that, when the target acceleration/deceleration calculated by target acceleration/deceleration calculation section 260 has a negative value, acceleration/deceleration control section 280 may control factors other than the amount of the braking operation.

Travelling resistance calculation section 300 calculates a travelling resistance (N) of vehicle 100, and outputs information of the calculated travelling resistance to target acceleration/deceleration calculation section 260. The travelling resistance is elaborated later.

Figure 2:
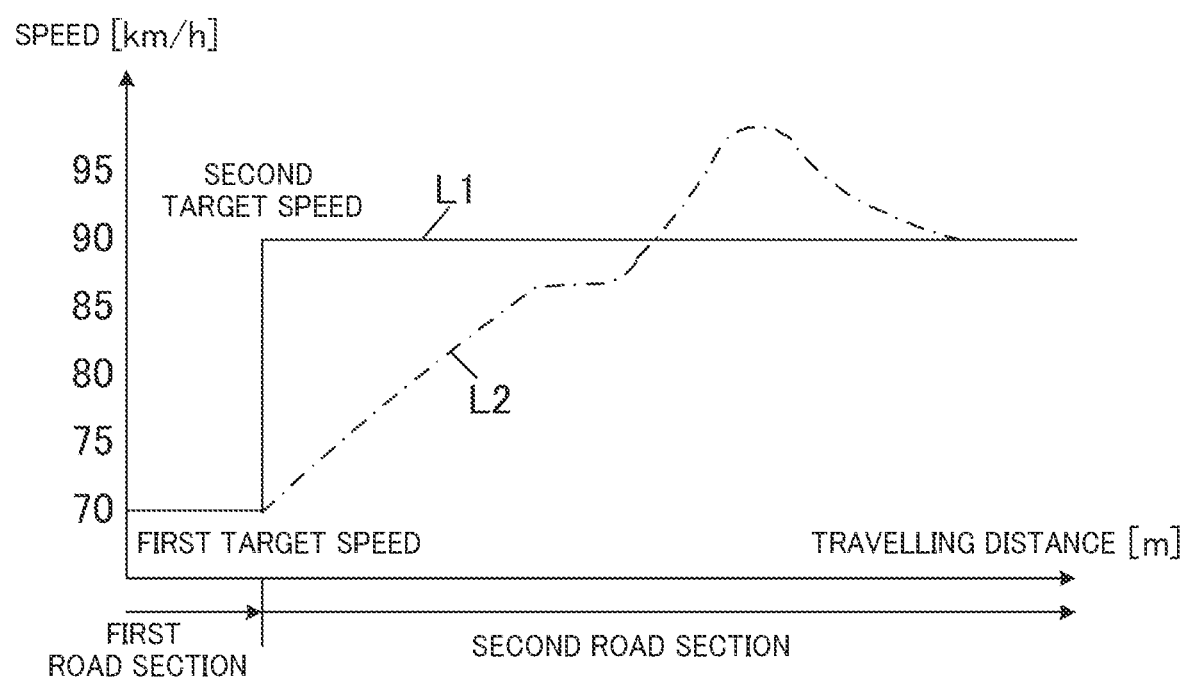
FIG. 2 illustrates a state where overshooting occurs.

Incidentally, when the target speed increases (i.e. vehicle 100 accelerates) stepwise during travelling of vehicle 100 along the driving route, the actual speed of vehicle 100 abruptly increases, and overshooting, in which the actual speed exceeds the target speed, might occur. FIG. 2 illustrates a state where overshooting occurs. In FIG. 2, solid line L1 indicates that the target speed increases from a first target speed (e.g. 70 [km/h]) to a second target speed (e.g. 90 [km/h]) as the actual position moves from the first road section to the second road section. Dashed line L2 indicates a variation of the actual speed of vehicle 100 in which the acceleration/deceleration control is performed in accordance with the variation of the target speed indicated by solid line L1. As illustrated in FIG. 2, when the target speed increases stepwise from the first target speed to the second target speed, overshooting in which the actual speed of vehicle 100 exceeds the target speed (second target speed) occurs.

Figure 3:
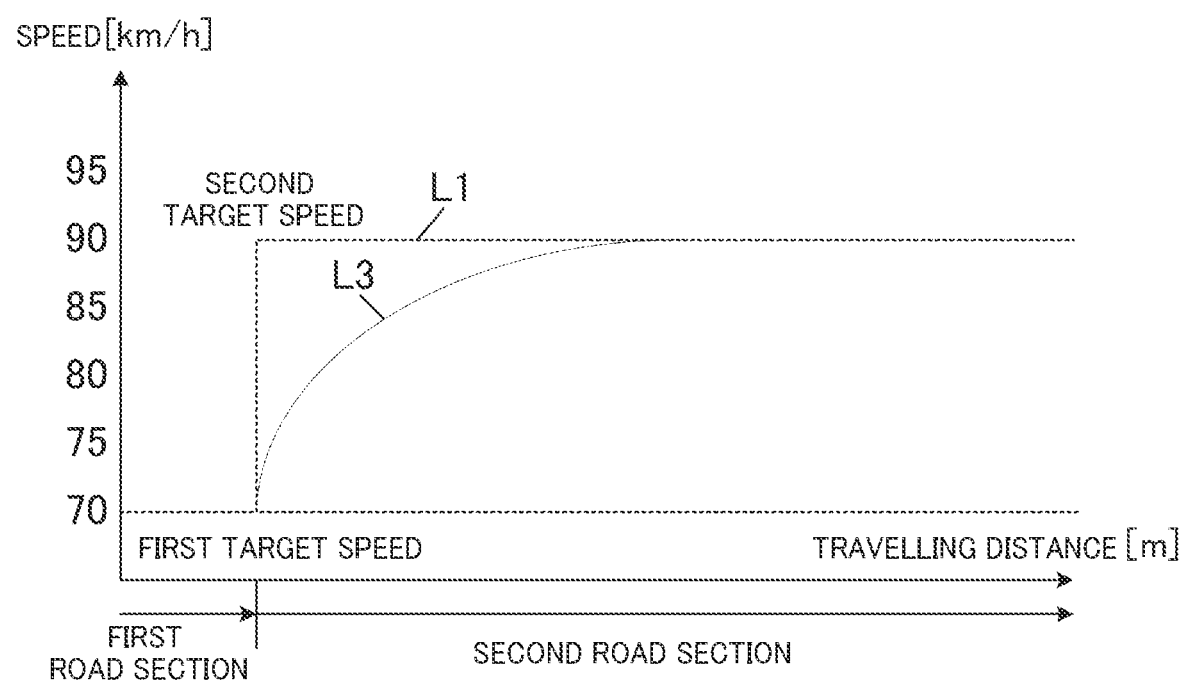
FIG. 3 illustrates a target speed that increases by a primary delay.

In view of this, in the present embodiment, in the driving route information stored in driving route information storage section 140, the target speed in the second road section is set in advance such that the actual speed of vehicle 100 increases from the first target speed to the second target speed by the primary delay in a period from the start position to the end position of the second road section as indicated with solid line L3 in FIG. 3. That is, the target speed is set such that the inclination of the variation of the target speed gradually decreases and that the target speed is not changed stepwise. To be more specific, the target speed in the second road section is set so as to gradually change with time by a time function expressed by the following Expression (1).

$$\text{Target speed} = \text{First target speed} + (\text{Second target speed} - \text{First target speed}) \times (1 - \exp(-t/T)) \quad (1)$$

Where t is an elapsed time after the actual position is moved from the first road section to the second road section, and T is a time constant of primary delay (a rough indication of response speed).

Time constant T of the primary delay is calculated by dividing, by the maximum acceleration of vehicle 100, a value obtained by subtracting the first target speed from the second target speed as expressed in the following Expression (2). The maximum acceleration of vehicle 100 is determined by Expression (6) described later for example.

$$\text{Time constant } T \text{ of Primary delay} = (\text{Second target speed} - \text{First target speed})/\text{Maximum acceleration of Vehicle 100} \quad (2)$$

Figure 4:
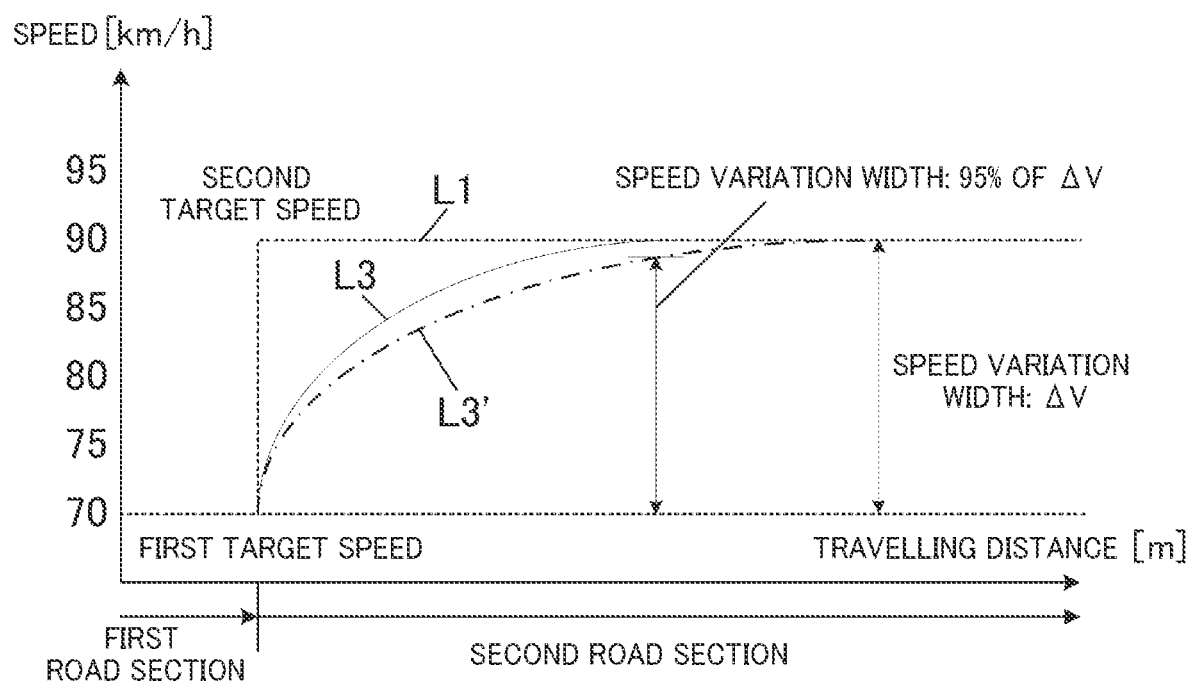
FIG. 4 illustrates a method of generating the target speed that increases by the primary delay.

As described above, while the target speed of the primary delay is generated by Expression (1), acceleration to the second target speed cannot be completed since acceleration time (t) taken for reaching the second target speed is infinite. In view of this, in the present embodiment, the target speed of the primary delay is generated as follows. Specifically, as illustrated in FIG. 4, a curve (dashed line L3' in FIG. 4) of the target speed of the primary delay for acceleration to 95[%] (hereinafter referred to as "rate") of the speed change width ($\Delta V$) is generated. Next, the generated curve is multiplied by a coefficient (1/0.95 when the rate is 95[%]) to extend the curve to the second target speed (see solid line L3 in FIG. 4). It is to be noted that the rate may be adjusted in a range of 65 to 99[%], for example, depending on the acceleration capability of vehicle 100.

Figure 5:
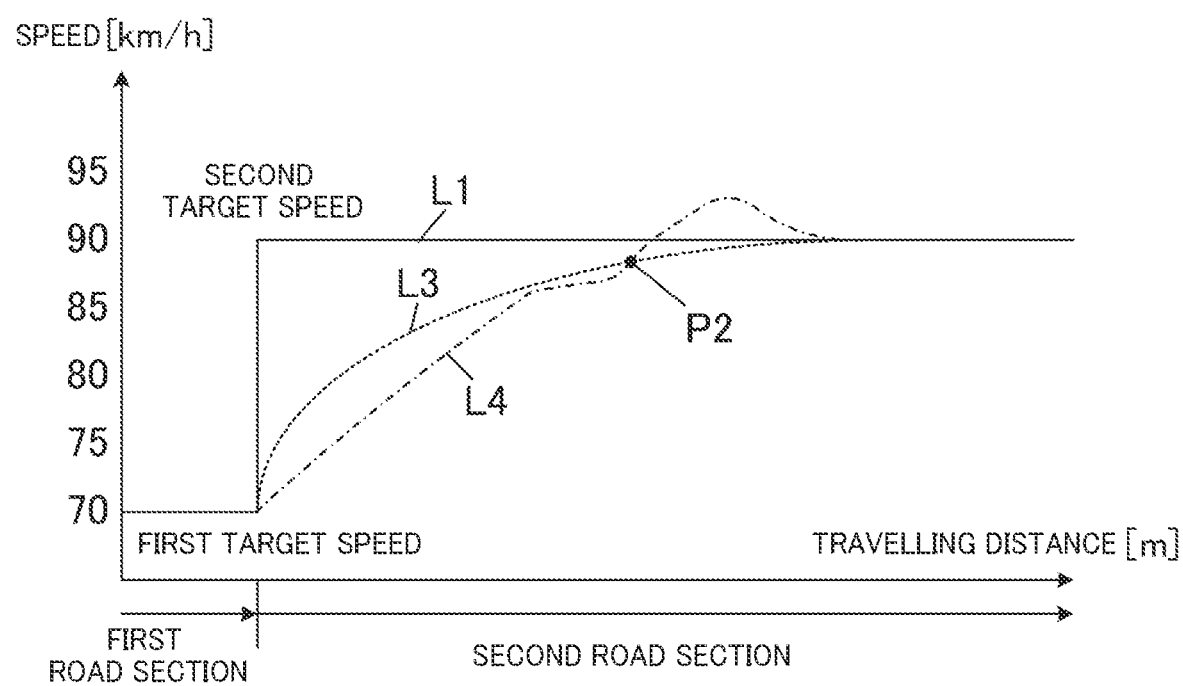
FIG. 5 illustrates a variation of the actual speed of the vehicle in the case where an acceleration/deceleration control is performed in accordance with a variation of the target speed that increases by the primary delay.

In FIG. 5, dot-dashed line L4 indicates a variation of the actual speed of vehicle 100 in the case where an acceleration/deceleration control is performed in accordance with a variation of the target speed increasing by the primary delay as indicated by dotted line L3. As illustrated in FIG. 5, while overshooting in which the actual speed of vehicle 100 exceeds the target speed (second target speed) occurs, the amount of overshooting is smaller than the case where the target speed increases stepwise (see FIG. 2).

Further, in the present embodiment, when a value obtained by multiplying an integration item of the PI control, that is, an integral of a deviation of the actual speed and the target speed by a control gain has a positive value at the timing (see P2 in FIG. 5) when the actual speed reaches the target speed in the case where the actual speed increases from the first target speed to the second target speed, target acceleration/deceleration calculation section 260 changes (resets) the integration item to 0. The reason for this is to prevent a situation in which a positive integration item is left after the actual speed reaches the target speed, and vehicle acceleration request is excessively performed on the electronic control machine (ECM).

Figure 6:
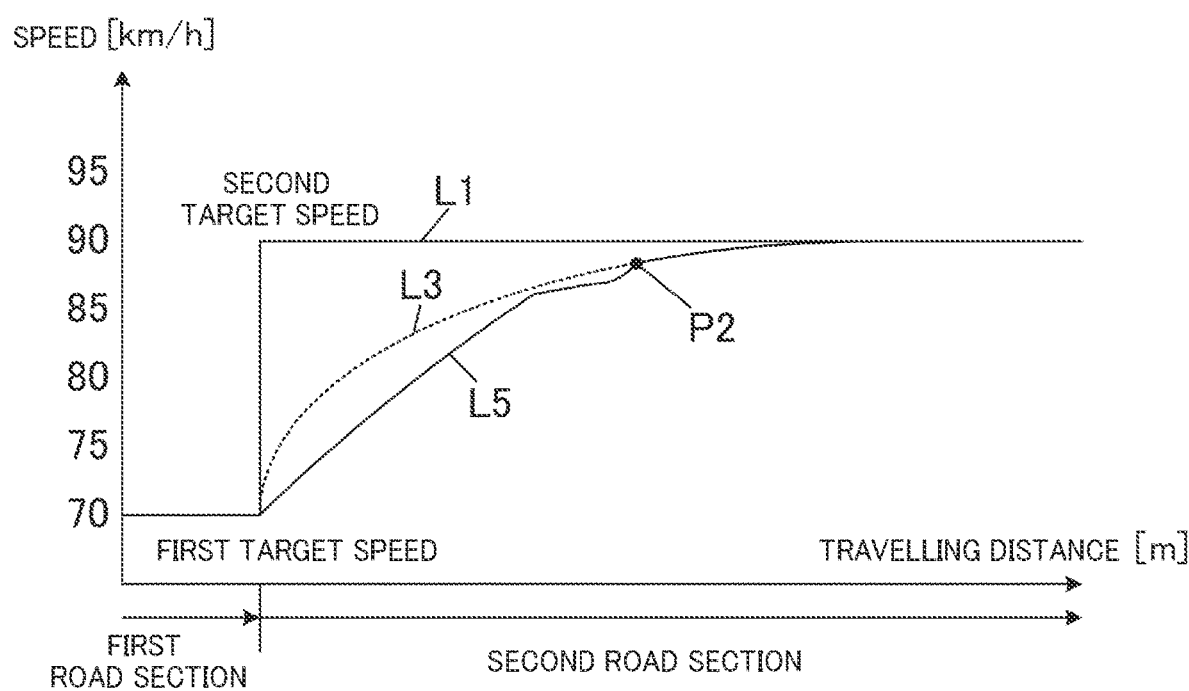
FIG. 6 illustrates a variation of the actual speed of the vehicle in the case where the integration item of the PI control is changed to 0 at the timing when the actual speed reaches the target speed.

In FIG. 6, solid line L5 indicates a variation of the actual speed of vehicle 100 in the case where the integration item of the PI control is changed to 0 at the timing when the actual speed reaches the target speed. As illustrated in FIG. 6, after the timing when the actual speed reaches the target speed, the actual speed is set to the target speed, and is increased to the second target speed without occurrence of overshooting.

Figure 7:
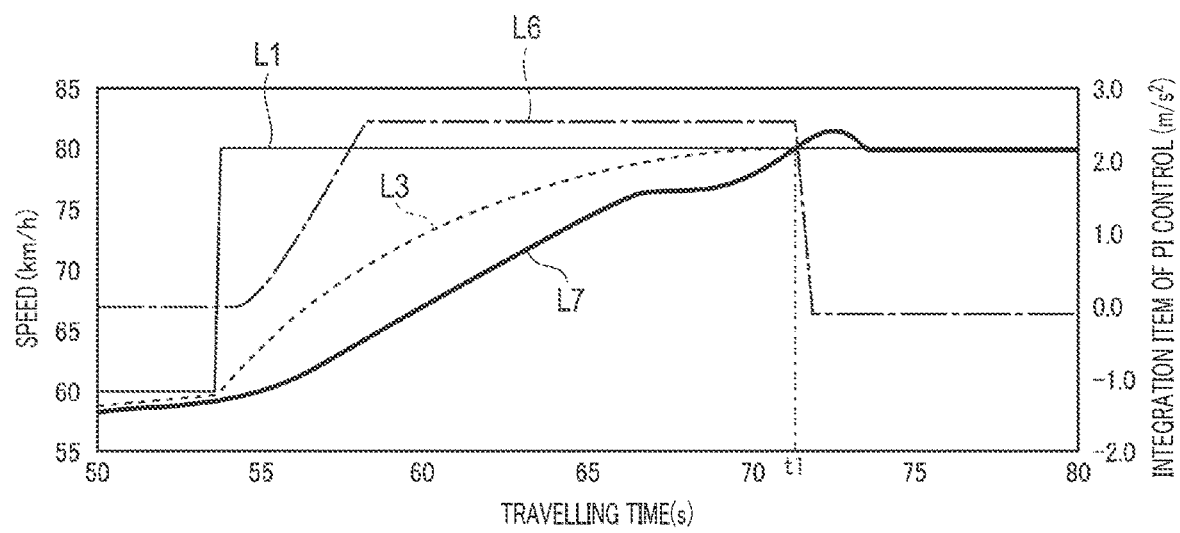
FIG. 7 shows the travelling speed and the integration item of the PI control with respect to the travelling time.

Incidentally, typically, the timing when the actual speed reaches the target speed might be delayed when the travelling resistance of vehicle 100 is high such as when vehicle 100 goes up a steep slope in the case where the actual speed is increased from the first target speed to the second target speed, for example. FIG. 7 illustrates the travelling speed and the integration item of the PI control with respect to the travelling time. In FIG. 7, dashed line L6 indicates the integration item of the PI control in the case where the speed is increased from the first target speed to the second target speed. Solid line L7 in FIG. 7 indicates a variation of the actual speed of vehicle 100. In addition, in FIG. 7, the first target speed is 60 km/h, and the second target speed is 80 km/h.

As illustrated in FIG. 7, when the speed is increased from the first target speed to the second target speed, the integration item of the PI control is increased toward 2.5 m/s2, which is a maximum acceleration and a fixed value, as the travelling time elapses as indicated with dashed line L6. However, in the case where the travelling resistance of vehicle 100 is high, vehicle 100 might not always be accelerated as intended. In this case, the speed deviation is increased between broken line L3 that is the target speed, and solid line L7 that is the actual speed, and setting of the actual speed to the target speed is delayed, and consequently, the timing when the actual speed of vehicle 100 reaches the target speed is delayed. As the timing when the actual speed of vehicle 100 reaches the target speed is delayed, the timing of resetting the integration item of the PI control is delayed. For example, in the case where the actual speed reaches the target speed which is significantly close to the second target speed (the travelling time t1), that is, when the actual speed of vehicle 100 reaches the second target speed, a positive portion is slightly left in the integration item of the PI control, and overshooting might occur. It is to be noted that, in FIG. 7, occurrence of overshooting (after the travelling time t1) is emphasized.

In view of this, in the present embodiment, target acceleration/deceleration calculation section 260 changes the maximum acceleration of vehicle 100 in accordance with the travelling resistance calculated by travelling resistance calculation section 300. As a result, the time constant of the primary delay in Expression (2) is changed, and in turn, the variation of the speed that increases by the primary delay with respect to the travelling time of vehicle 100 is reduced. Since the variation of the speed that increases by the primary delay with respect to the travelling time of vehicle 100 is reduced as the travelling resistance increases, the timing when the actual speed reaches the target speed is advanced. As a result, the reset timing of the integration item of the PI control is not delayed, and occurrence of overshooting is suppressed. The travelling resistance of vehicle 100 and the control of target acceleration/deceleration calculation section 260 are elaborated below.

The travelling resistance of vehicle 100 is calculated based on the sum of the air resistance of travelling vehicle 100, the rolling resistance of travelling vehicle 100, and the grade resistance of the road on which vehicle 100 travels.

The air resistance of travelling vehicle 100 is a resistance generated by friction between the surface of vehicle 100 and air. Travelling resistance calculation section 300 calculates the air resistance by acquiring the air resistance coefficient and the travelling speed (km/h) of vehicle 100 from a measurement section not illustrated and the like, for example. The air resistance of vehicle 100 is calculated with the following Expression (3).

$$\text{Air resistance} = \lambda \times S \times V^2 \times g \tag{3}$$

where V is the travelling speed, λ the air resistance coefficient, S the projection area of the front surface of vehicle 100, and g the gravitational acceleration.

The rolling resistance of travelling vehicle 100 is a frictional resistance of the bearing of a rolling wheel, and a resistance generated by the energy loss between the road surface and the tire. Travelling resistance calculation section 300 calculates the rolling resistance by acquiring rolling resistance coefficient information from a measurement section not illustrated and the like, for example. The rolling resistance is calculated with Expression (4).

$$\text{Rolling resistance} = \mu \times W \times g \tag{4}$$

where μ is the rolling resistance coefficient, W the vehicle weight, and g the gravitational acceleration.

The grade resistance of the road on which vehicle 100 travels is a resistance which is generated when a vehicle goes up a slope. Travelling resistance calculation section 300 calculates the grade resistance by acquiring information of the road grade (in this specification, the angle) from map information storage section 120 and the like, for example. The grade resistance is calculated with Expression (5).

$$\text{Grade resistance} = W \times \sin \theta \times g \tag{5}$$

where θ is the road grade, W the vehicle weight, and g the gravitational acceleration.

By varying the maximum acceleration used by target acceleration/deceleration calculation section 260 in Expression (2) by using the travelling resistance of vehicle 100, the target speed of the primary delay, that is, the target speed in the second road section, is set such that the variation of the speed that increases by the primary delay with respect to the travelling time of vehicle 100 is changed. Target acceleration/deceleration calculation section 260 varies the maximum acceleration of vehicle 100 as in Expression (6).

$$\begin{aligned}\text{Maximum acceleration of Vehicle 100} &= (\text{Maximum driving force of Vehicle 100} - \text{Travelling resistance of Vehicle 100})/\text{vehicle weight of vehicle 100}\end{aligned} \tag{6}$$

By changing the maximum acceleration by using Expression (6), the maximum acceleration is changed such that it decreases as the travelling resistance increases. That is, the target speed of the primary delay is set such that the variation of the speed that increases by the primary delay with respect to the travelling time of vehicle 100 decreases as the travelling resistance increases. With this configuration, the setting time taken for reaching the second target speed from the first target speed increases as the travelling resistance increases, and thus a time enough to accelerate vehicle 100 can be ensured. Therefore, the actual speed can reach the target speed at an initial stage of acceleration in the setting time.

It is to be noted that the maximum driving force of vehicle 100 is calculated based on the maximum torque which can be generated by the engine mounted in vehicle 100.

Figure 8:
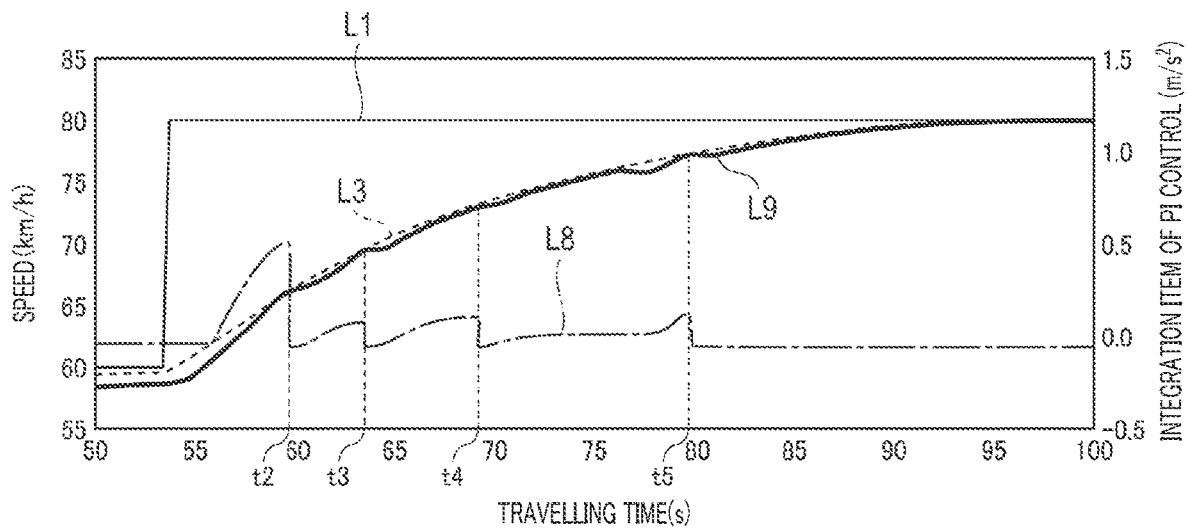
FIG. 8 shows the travelling speed and the integration item of the PI control with respect to the travelling time.

Now the operation and effect of vehicle 100 having the above-mentioned configuration are described. FIG. 8 shows the travelling speed and the integration item of the PI control with respect to the travelling time of vehicle 100 travelling up a steep slope. Dashed line L8 indicates the integration item of the PI control when increasing the speed from the first target speed to the second target speed. Solid line L9 indicates a variation of the actual speed of vehicle 100.

As illustrated in FIG. 8, for example, when the speed of vehicle 100 travelling up a steep slope or the like is increased from the first target speed to the second target speed (see solid line L1), the travelling resistance is calculated by travelling resistance calculation section 300, and the setting time of the target speed of the primary delay (broken line L3) is set to 41 s, which is longer than the setting time (18 s) of the target speed of the primary delay in FIG. 7. Along with increase of the integration item of the PI control (dashed line L8), the actual speed (solid line L9) gradually comes close to the target speed (broken line L3), and the actual speed reaches the target speed at the time point of the travelling time t2 (approximately 10 s after the start of acceleration). That is, it is possible to set the actual speed to the target speed at an initial stage of the acceleration at a timing when the second target speed has not yet reached the target speed. With this configuration, the integration item of the PI control can be reset at an initial stage of acceleration, and thus it is possible to suppress occurrence of overshooting in which the actual speed exceeds the second target speed due to a positive integration item.

In addition, since the integration item of the PI control is reset at a position, such as the travelling time t2, where the target speed of the primary delay is not increased with respect to the second target speed, the actual speed might be reduced with respect to the target speed due to the travelling resistance. In this case, the integration item of the PI control is again increased, and as a result the actual speed is increased. When the actual speed is increased to again reach the target speed (the travelling time t3), the integration item of the PI control is reset. Also after the travelling time t3, when the actual speed becomes lower with respect to target speed, acceleration is again performed as described above and the integration item of the PI control is reset every time when the actual speed reaches the target speed (the travelling times t4 and t5). By repeatedly resetting the integration item of the PI control in this manner, the excess of the target speed of the actual speed can be reduced. That is, the situation that abrupt increase of the actual speed of vehicle 100 coming close to the second target speed is suppressed, and thus occurrence of overshooting can be further suppressed.

In addition, since the target speed is set such that the inclination of the variation of the target speed gradually decreases and that the target speed does not vary stepwise, it is possible to suppress occurrence of overshooting in which the actual speed exceeds the target speed (second target speed) when vehicle 100 is accelerated from the first target speed to the second target speed.

In addition, since the variation of the speed that increases by the primary delay with respect to the travelling time of vehicle 100 is reduced as the travelling resistance increases, a time enough for acceleration of vehicle 100 can be ensured. Therefore, it is possible to set the actual speed to the target speed at an initial stage of acceleration with respect to the setting time of the target speed of the primary delay, and in turn, occurrence of overshooting can be further suppressed.

While the target speed is set such that the speed variation that increases by the primary delay is reduced as the travelling resistance increases in the present embodiment, the present disclosure is not limited to this. For example, the integration item of the PI control may be reset at a timing before reaching the target speed in accordance with the travelling resistance without changing the speed variation that increases by the primary delay. In this manner, the actual speed is slightly increased by the positive integral left after the reset, and accordingly the actual speed can be increased to the value of the target speed.

In addition, while the integration item of the PI control is changed to 0 at the timing when the actual speed reaches the target speed in the case where the actual speed is increased from the first target speed to the second target speed in the present embodiment, present disclosure is not limited to this. For example, the integration item of the PI control may be changed to 0 at a timing before the actual speed reaches the target speed, or, after the actual speed reaches the target speed. That is, it is only necessary that the integration item of the PI control is changed to 0 at a timing at where occurrence of overshooting is further suppressed.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof.

This application is entitled to and claims the benefit of Japanese Patent Application No. 2016-098023 filed on May 16, 2016, the disclosure of which including the specification, drawings and abstract is incorporated herein by reference in its entirety.

INDUSTRIAL APPLICABILITY

The present disclosure is useful for a speed control device which can suppress occurrence of overshooting in acceleration of a vehicle.

REFERENCE SIGNS LIST

100 Vehicle
120 Map information storage section
140 Driving route information storage section
160 Actual position detection section
180 Actual speed detection section
200 Speed control device
220 Actual position acquiring section
240 Actual speed acquiring section
260 Target acceleration/deceleration calculation section
280 Acceleration/deceleration control section
300 Travelling resistance calculation section

The invention claimed is:

1. A speed control device configured to control a speed of a vehicle travelling along a driving route including a plurality of road sections including first and second road sections, wherein a target speed is set for each of the plurality of road sections, the speed control device comprising:
a speed control circuitry, wherein the speed control circuitry:
acquires an actual speed of the vehicle,
acquires an actual position of the vehicle,
controls an acceleration/deceleration of the vehicle such that the actual speed is set to a target speed set for a road section corresponding to the actual position, and
calculates a travelling resistance of the vehicle in a travelling state,
wherein a target speed for the second road section is set such that, in a case where the target speed is increased from a first target speed to a second target speed as the actual position moves from the first road section to the second road section, the actual speed is set to be increased from the first target speed to the second target speed by a primary delay between a start position and an end position of the second road section,
wherein a maximum acceleration of the vehicle is changed based on the travelling resistance calculated by the speed control circuitry,
wherein a time constant of the primary delay is changed in accordance with the maximum acceleration, and
wherein the target speed for the second road section is changed in accordance with the time constant of the primary delay and thereby is set such that a variation of the target speed per unit time that increases by the primary delay with respect to a travelling time of the vehicle is reduced as the travelling resistance calculated by the speed control circuitry increases.

2. The speed control device according to claim 1, wherein the speed control circuitry changes, to 0, a value obtained by multiplying an integral value of a deviation between the actual speed and the target speed by a control gain at a timing when the actual speed reaches the target speed when the actual speed is increased from the first target speed to the second target speed by controlling the acceleration/deceleration of the vehicle such that the actual speed is set to the target speed.

3. The speed control device according to claim 1, wherein the time constant of the primary delay is calculated by dividing, by a maximum acceleration of the vehicle, a value obtained by subtracting the first target speed from the second target speed.

4. The speed control device according to claim 1, wherein the travelling resistance is calculated by a sum of an air resistance of the vehicle in the travelling state, a rolling resistance of the vehicle in the travelling state, and a grade resistance of a road on which the vehicle travels.

* * * * *